United States Patent [19]

Nomura et al.

[11] Patent Number: 5,073,921
[45] Date of Patent: Dec. 17, 1991

[54] LINE CONNECTION SWITCHING APPARATUS FOR CONNECTING COMMUNICATION LINE IN ACCORDANCE WITH MATCHING RESULT OF SPEECH PATTERN

[75] Inventors: Norimasa Nomura, Yokohama; Masahiro Nishihata, Tokyo, both of Japan

[73] Assignee: Kabushiki Kaisha Toshiba, Kawasaki, Japan

[21] Appl. No.: 472,433

[22] Filed: Feb. 1, 1990

Related U.S. Application Data

[63] Continuation of Ser. No. 252,979, Oct. 4, 1988, abandoned.

[30] Foreign Application Priority Data

Nov. 30, 1987 [JP] Japan ............................. 62-302644

[51] Int. Cl.⁵ ..................... H04M 11/00; H04M 1/64
[52] U.S. Cl. ................................. 379/100; 379/88; 358/438; 381/43
[58] Field of Search ............ 379/93, 96–98, 379/100, 88; 358/434, 432, 438; 381/43

[56] References Cited

U.S. PATENT DOCUMENTS

| | | | |
|---|---|---|---|
| 3,377,428 | 4/1968 | Dersch | 381/43 |
| 4,063,031 | 12/1977 | Grunza | 381/43 |
| 4,764,966 | 8/1988 | Einkauf et al. | 379/351 |
| 4,794,637 | 12/1988 | Hashimoto | 379/100 |
| 4,815,121 | 3/1989 | Yoshida | 379/100 |
| 4,837,797 | 6/1989 | Freeny, Jr. | 379/96 |
| 4,910,506 | 3/1990 | Yoshida et al. | 379/100 |

FOREIGN PATENT DOCUMENTS

| | | | |
|---|---|---|---|
| 2321219 | 3/1977 | France | 379/93 |
| 57-62654 | 4/1982 | Japan . | |
| 58-87956 | 5/1983 | Japan . | |
| 0120371 | 7/1983 | Japan | 379/100 |
| 0025466 | 2/1984 | Japan | 379/98 |
| 0160372 | 9/1984 | Japan | 379/100 |
| 0259058 | 12/1985 | Japan | 379/100 |
| 61-88645 | 5/1986 | Japan . | |
| 61-167251 | 7/1986 | Japan . | |
| 0163445 | 7/1987 | Japan | 379/93 |

*Primary Examiner*—James L. Dwyer
*Assistant Examiner*—Wing F. Chan
*Attorney, Agent, or Firm*—Oblon, Spivak, McClelland, Maier & Neustadt

[57] ABSTRACT

A line connection switching apparatus performs connection switching of a communication line used both for speech communication performed by a telephone set and data communication performed by a facsimile apparatus and is inserted between the telephone set and the facsimile apparatus, and the communication line. When predetermined speech command information is input from a caller side through the communication line, a speech signal is detected by a switching unit. When a voice/silence discriminator discriminates that the speech signal represents voice, a voice interval monitor monitors a duration of the speech signal. If the duration of the speech signal falls within a predetermined range, the speech signal is stored in a speech signal storage unit. A pattern matching unit verifies whether a standard speech pattern of a speech signal registered in standard pattern dictionary unit matches with a speech pattern of the input speech signal stored in the speech signal storage unit. In accordance with a verification result, if the speech pattern of the input speech signal coincides with the standard pattern, the switching unit switches connection of the communication line to the facsimile apparatus.

4 Claims, 2 Drawing Sheets

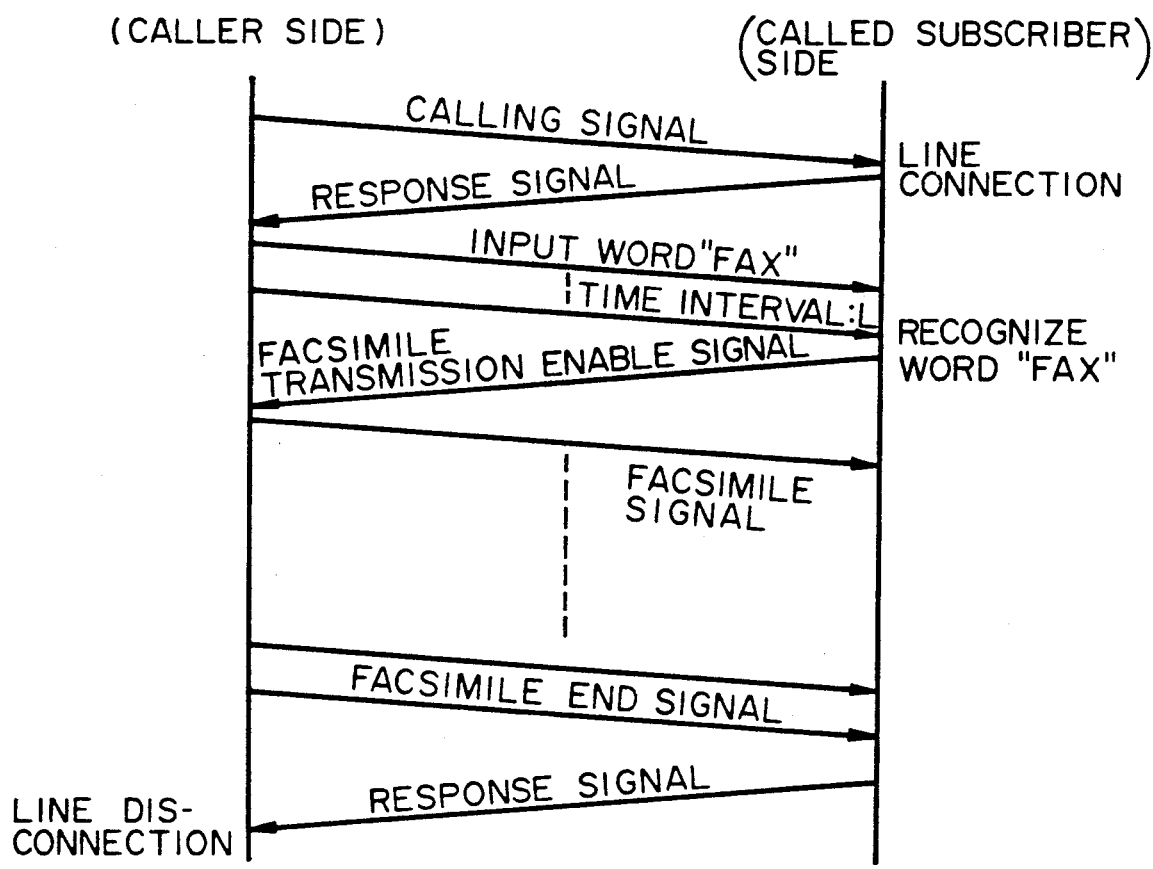
F I G. 3
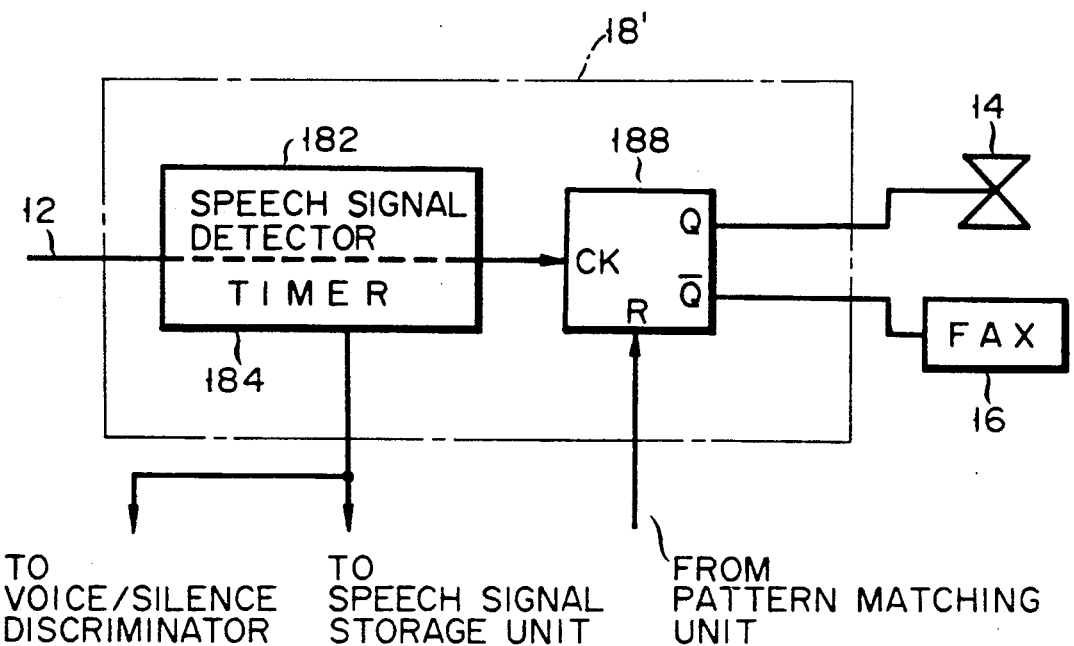
F I G. 4

1

LINE CONNECTION SWITCHING APPARATUS FOR CONNECTING COMMUNICATION LINE IN ACCORDANCE WITH MATCHING RESULT OF SPEECH PATTERN

This application is a continuation of application Ser. No. 252,979, filed on Oct. 4, 1988, now abandoned.

BACKGROUND OF THE INVENTION

1. Field of the Invention

The present invention relates to a line connection switching apparatus and, more particularly, to a line connection switching apparatus for switching a line used both for speech communication and data communication performed by data communication supply.

2. Description of the Related Art

Recently, a single communication line is used both for speech communication performed by a speech communication apparatus such as a telephone set and data communication performed by a data communication apparatus such as a facsimile apparatus. When a communication line is used in this manner, a special communication line for data communication using a facsimile apparatus or the like need not be provided in addition to a telephone line for speech communication. Therefore, such a system is very advantageous in terms of cost.

In this system, a line connection switching apparatus is used to selectively connect one of the speech and data communication apparatus to the communication line so that the communication line can be switched to either speech communication or data communication, i.e., can be commonly used. However, in general, the communication line is mainly used for speech communication in a conventional system. Therefore, a line connection switching apparatus of this type responds to an incoming call first as a telephone set. Then, if speech from a caller is input in correspondence to this response, the line connection switching apparatus causes the communication line to perform speech communication while the communication line is connected to a speech communication terminal such as a telephone set. Meanwhile, if no speech is input from a caller, the line connection switching apparatus monitors the input for a predetermined time interval, confirms that no speech is input throughout the predetermined time interval, and then switches the communication line to a data communication terminal such as a facsimile apparatus. Thereafter, data communication (facsimile reception) is performed. This is described in Japanese Patent Disclosure (Kokai) No. 58-87956.

When the communication line is mainly used for data communication, a predetermined facsimile transmission sequence is performed when, e.g., an incoming call is detected. Then, after a failure of the facsimile transmission sequence is confirmed by, e.g., visual observation, an operation for switching the communication line to the speech communication apparatus is activated.

However, in order to switch the communication line from the speech communication apparatus to the data communication apparatus or vice versa in this manner, monitoring for the predetermined time interval must be performed. For this reason, connection switching of the line cannot be rapidly performed when an incoming call is input. Assuming that inputting of a speech signal requires a predetermined period of time, a time is required for a callee to detect this and perform connection switching to the data communication apparatus. It is proposed to control connection switching by sending a predetermined control signal from a caller. For example, a predetermined command from a callee is supplied to and confirmed by a caller. In this case, however, a control system is bulky and troublesome.

As described above, according to the conventional line connection switching apparatus, connection switching of the speech communication apparatus and the data communication apparatus to the communication line cannot be rapidly and easily performed for a predetermined time interval immediately after the communication line is connected.

SUMMARY OF THE INVENTION

Accordingly, it is an object of the present invention to provide a line communication switching apparatus which can rapidly and easily perform connection switching of a speech communication apparatus and a data communication apparatus to a communication line.

According to an aspect of the present invention, there is provided a line connection switching apparatus comprising means for detecting a duration of a speech signal input after start of communication through a communication line used both for speech communication and data communication, recognizing means for recognizing the speech signal having the duration falling within a predetermined range and recognizing the speech signal when the duration of the speech signal falls within the predetermined range, and means for selecting an apparatus to be connected to the communication line in accordance with a result of the recognizing means.

BRIEF DESCRIPTION OF THE DRAWINGS

The above and other objects will become more readily apparent as the invention is more fully understood from the detailed description to follow, reference being had to the accompanying drawings in which:

FIG. 3 is a view showing a signal sequence representing switching control of line connection in the embodiment shown in FIG. 1; and FIG. 4 is a block diagram showing a switching unit and its peripheral blocks of a second embodiment of the line connection switching apparatus according to the present invention.

DETAILED DESCRIPTION OF THE PREFERRED EMBODIMENTS

An embodiment of the present invention will be described below with reference to the accompanying drawings.

Figure 1:
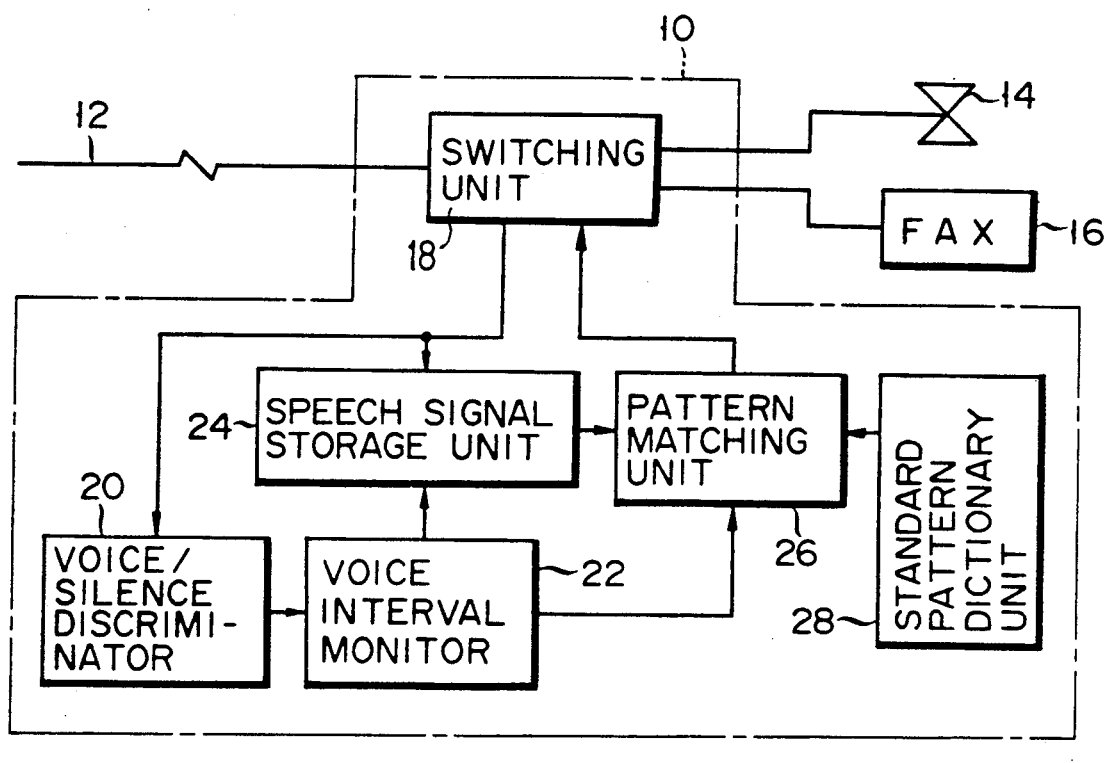
FIG. 1 is a block diagram schematically showing a first embodiment of a line connection switching apparatus according to the present invention.

FIG. 1 is a schematic block diagram of a line connection switching apparatus according to the embodiment of the present invention. In FIG. 1, reference numeral 12 denotes a communication line used for both speech communication and data communication; 14, a telephone set as a speech communication apparatus for performing speech communication through line 12; and 16, a facsimile apparatus as a data communication apparatus for performing data communication through line 12. Line connection switching apparatus 10 of the present invention is inserted between line 12, and telephone set 14 and facsimile apparatus 16, and selectively connects one of telephone set 14 and facsimile apparatus 16 to line 12.

Figure 2:
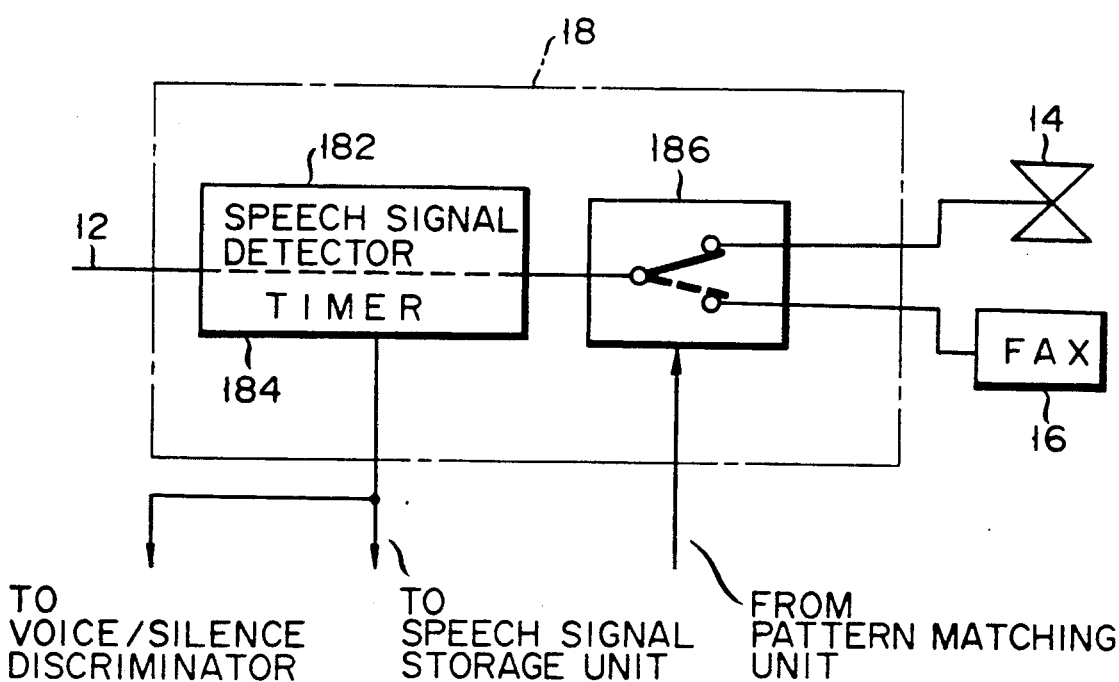
FIG. 2 is a block diagram showing a switching unit and its peripheral blocks shown in FIG. 1.

In FIG. 1, reference numeral 18 denotes a switching unit comprising a switch mechanism. In accordance with an operational state of unit 18, one of telephone set 14 and facsimile apparatus 16 is selectively connected to line 12. As shown in FIG. 2, unit 18 includes speech signal detector 182 for detecting a speech signal input through line 12. Detector 182 has timer 184 and detects the speech signal o the basis of a time determined by timer 184. In this manner, the speech signal input through line 12 is supplied to apparatus 10 through detector 182. Note that detector 182 comprises a buffer amplifier and the like for branching and outputting a signal from line 12.

Voice/silence discriminator 20 discriminates whether the input speech signal detected by detector 182 represents voice or silence. For example, discriminator 20 discriminates the input signal on the basis of a predetermined threshold value of a speech energy determined in accordance with a noise level or the like. This is because the speech signal fetched in apparatus 10 includes a background noise component other than a speech. command for instructing connection switching of line 12 as a speech signal. Therefore, when a signal component exceeding the threshold value is input, this signal component is detected as an input speech signal representing voice.

When discriminator 20 detects an input speech signal representing voice, voice interval monitor 22 activates speech signal storage unit 24. Then, monitor 22 causes storage unit 24 to start storage of a speech signal input when the input speech signal representing voice is detected by discriminator 20 and at the same time monitors the voice interval by measuring a duration of voice detection. In this case, the voice interval starts from a timing at which the level of a signal component exceeds the predetermined threshold value, i.e., voice is represented, and ends at a timing at which the level is reduced below the predetermined threshold value. When the voice interval ends, monitor 22 controls storage unit 24 to stop storage of the speech signals.

That is, monitor 22 determines voice interval L measured from a timing at which the speech signal is detected to represent voice by discriminator 20. Voice interval L is determined by determining whether interval L is present between predetermined times $\gamma$ and $\delta$, i.e., whether interval L satisfies a relation of ($\gamma \leq L \leq \delta$).

When interval L satisfies the above relation, monitor 22 determines that the speech signal input when the signal of voice is detected by discriminator 20 may be a speech command and drives pattern matching unit 26. Unit 26 reads out and analyzes the speech signal stored in storage unit 24 and verifies whether a characteristic pattern of a speech obtained by the analysis matches with a standard pattern of a speech command registered in standard pattern dictionary unit 28.

Pattern matching unit 26 controls switching unit 18 in accordance with a pattern matching result. That is, when unit 26 confirms that the input speech signal represents a specific speech command, it supplies a switch signal to switching unit 18 in accordance with the speech command information. Then, in accordance the switch signal, unit 26 operates a switch, e.g., relay switch 186 in switching unit 18 to connect line 12 which is connected to telephone set 14 to facsimile apparatus 16. In this manner, unit 26 controls connection switching of telephone set 14 and facsimile apparatus 16 in accordance with the switch signal corresponding to the speech command, thereby switching line 12.

Note that recognizing processing of the speech signal performed by pattern matching unit 26 is known to those skilled in the art, i.e., conventional speech recognizing methods may be arbitrarily applied.

An operation of the above embodiment will be described below with reference to a signal sequence shown in FIG. 3.

Before using line connection switching apparatus 10, speech commands must be given to standard pattern dictionary unit 28 to be registered. For example, speech commands "FAX", "TELEPHONE", and "DATA" are given as standard patterns by a voice of a caller. In this case, detection times $\gamma$ and $\delta$ of the voice interval for detecting the speech commands are set as follows, for example:

$\gamma = 0.3$ sec, $\delta = 1.0$ sec

A caller sends a calling signal to a callee using a telephone set at a caller side through apparatus 10 in which the standard patterns are registered in dictionary unit 28. When the line is connected, the caller side sends a response signal to the callee side. At this time, switching unit 18 is controlled such that apparatus 10 is connected to telephone set 14 when line 12 is connected. Then, in order to switch line 12 from telephone set 14 to facsimile apparatus 16, the caller side inputs a predetermined speech command "FAX" through telephone set 14. The speech command can be input any time as long as telephone set 14 is connected to line 12. In this case, assume that the command is input when the caller side receives the response signal from the caller side corresponding to the calling.

When the speech command "FAX" is input, the speech signal is detected by speech detector 182 in switching unit 18. Discriminator 20 discriminates whether the detected speech signal represents voice or silence. That is, discriminator 20 discriminates that a component of the detected speech signal (speech command "FAX") continuously exceeds the predetermined threshold value over a predetermined period of time, i.e., that the input signal represents voice.

The speech signal discriminated to represent voice by discriminator 20 is stored in storage unit 24 and at the same time a voice interval of the signal is monitored by monitor 22. When the voice interval of the speech signal ends, monitor 22 controls storage unit 24 to stop storage of the speech signal. As a result, voice interval L is obtained. That is, interval L of the speech command "FAX" is 0.3 sec. to 1.0 sec., monitor 22 determines that the speech command instructs connection switching of switching unit 18.

The speech signal in which interval L satisfies the relation described above is read out from storage unit 24 and its signal component is analyzed by pattern matching unit 26. Unit 26 verifies whether a characteristic pattern of the input speech signal obtained by this analysis matches with the standard pattern of the speech command registered in dictionary unit 28. As a result of matching, if unit 26 recognizes that the characteristic pattern of the input speech signal coincides with the standard pattern registered in dictionary unit 28, it supplies a switch signal to switching unit 18. In accordance with the switch signal, switching unit 18 is controlled to switch line 12 from telephone set 14 to facsimile apparatus 16. That is, the input speech command "FAX" is recognized to be a command for instructing switching of line 12. Therefore, the switch signal is supplied to switch 186 of switching unit 18, thereby operating switch 186. In this manner, line 12 is switched from telephone set 14 to facsimile apparatus 16. In order to inform completion of connection switching of switching unit 18, the called subscriber side transmits a facsimile transmission enable signal to the caller side.

In this manner, when the facsimile is set in a transmission enable state, a predetermined facsimile signal input by operation buttons or the like (not shown) of facsimile apparatus 10 is transmitted from the caller side to the called subscriber side. When transmission by the facsimile is finished, the caller side transmits a facsimile end signal to the called subscriber side. In response to this signal, the called subscriber side transmits a response signal to the caller side, thereby disconnecting the line.

According to the line connection switching apparatus 10 having the above arrangement, it is only when a speech command having a predetermined voice interval is input through line 12, that a recognizing processing for the speech signal is performed. Then, connection switching of the line performed by switching unit 18 is controlled in accordance with a recognition result. In other words, when speech communication is performed by telephone set 14 through line 12, pattern matching processing for detecting a speech command is not activated because a duration of the speech signal is generally long. When a speech signal other than the speech command is input, pattern matching unit 26 fails to perform pattern matching. For this reason, switching unit 18 is not erroneously controlled. Therefore, only when a caller inputs a speech command instructing connection switching intended by the caller, connection switching of telephone set 14 and facsimile apparatus 16 to line 12 is controlled in accordance with the speech command.

For this reason, as shown in the signal sequence in FIG. 3, by inputting the speech command from the caller side when the response signal from the called subscriber side to the caller side is received, connection switching between telephone set 14 and facsimile apparatus 16 is immediately performed.

Therefore, the speech communication line of the telephone set or the like can be instantaneously switched to the communication line of the facsimile apparatus or the like to start communication. In addition, no control signal need be transmitted from a caller side to control connection switching.

In the above embodiment, the switch of the switching unit comprises a relay switch. However, the switch may comprise a flip-flop. An embodiment in which a flip-flop is used as a switch of a switching unit will be described below. An arrangement and an operation of parts other than the flip-flop are the same as those of the first embodiment, a detailed description thereof will be omitted.

As shown in FIG. 4, switching unit 18' detects a speech signal input through communication line 12 and has timer 184. A speech signal input through line 12 is supplied to voice/silence discriminator 20 and speech signal storage unit 24 in line connection switching apparatus 10 through speech signal detector 182. Thereafter, voice interval monitor 22 performs predetermined processing, and switching unit 18' is controlled in accordance with a pattern matching result obtained by pattern matching unit 26 as described above.

Specific speech command information from unit 26, i.e., a switch signal for switching line 12 is supplied to reset terminal R of flip-flop 188 of switching unit 18'. Flip-flop 188 receives a signal from detector 182 at its clock terminal CK, its output terminal Q is coupled to telephone set 14, and its output terminal $\bar{Q}$ is coupled to facsimile apparatus 16. Only when a characteristic pattern of an input speech signal coincides with the standard pattern in pattern matching unit 26, the switch signal is supplied to reset terminal R. Therefore, output terminal $\bar{Q}$ is turned on at the facsimile apparatus 16 side. That is, output terminal Q at the telephone set 14 side is normally turned on. However, only when a signal of the speech command information is supplied to reset terminal R, line 12 connected to telephone set 14 is connected to facsimile apparatus 16. In this manner, unit 26 controls connection switching of telephone set 14 and facsimile apparatus 16 in accordance with the speech command, thereby switching line 12.

As has been described above, according to the apparatus of the present invention, even when data communication is performed, connection switching can be instructed by only inputting a predetermined speech command from a caller side, thereby starting speech communication. More specifically, connection switching of a speech communication apparatus and a data communication apparatus to a communication line can be simply and immediately performed when a speech command is input without recognizing all input speech signals. Therefore, switching of line connection can be effectively and efficiently controlled.

The present invention is not limited to the above embodiments. For example, although facsimile communication has been described as data communication, the present invention can be similarly applied to connection switching for performing personal computer communication. In addition, the type of speech command is not limited. Furthermore, a detection time of a voice interval may be determined in accordance with a set speech command.

What is claimed is:

1. A switching apparatus for switching a line which is connected to a telephone, to a facsimile device, in response to a speech command coming from the line, said apparatus comprising:
   means for discriminating between a speech signal and noise coming from the line, based on a predetermined threshold value;
   first storing means for storing the speech signal discriminated by the discriminating means;
   means for detecting the speech signal as a candidate of the speech command when a duration of the signal discriminated by the discriminating means falls within a predetermined range;
   second storing means for storing a standard characteristic pattern of the speech command;
   means for comparing a characteristic pattern of the speech signal detected as a candidate of the speech command with the standard characteristic pattern of the speech command; and
   means for switching the line which is connected to the telephone, to the facsimile device when the characteristic pattern of the speech signal detected as a candidate of the speech command matches a standard characteristic pattern of the speech command in the means for comparing.

2. A switching apparatus according to claim 1, wherein said threshold value is a threshold value of energy.

3. A switching apparatus according to claim 1, wherein said first storing means stores the speech signal after a communication is started and said means for comparing compares patterns after the communication is stored.

4. An apparatus according to claim 1, wherein said means for switching comprises a relay switch.

* * * * *